(12) United States Patent
Choi et al.

(10) Patent No.: US 6,379,788 B2
(45) Date of Patent: *Apr. 30, 2002

(54) ANTIREFLECTION FILM

(75) Inventors: Hyung-Chul Choi, Lexington; Robert L. Jones, Andover; Pradnya V. Nagarkar, Newton; William K. Smyth, Sudbury, all of MA (US)

(73) Assignee: 3M Innovative Properties Company, St. Paul, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/197,006

(22) Filed: Nov. 20, 1998

Related U.S. Application Data

(63) Continuation-in-part of application No. 09/026,271, filed on Feb. 19, 1998.

(51) Int. Cl.[7] ............................................. B32B 15/00
(52) U.S. Cl. ........................ 428/333; 428/332; 428/336; 428/339; 427/164
(58) Field of Search ................................. 428/421, 422, 428/483, 333, 215, 434, 472, 699, 336, 339, 332; 427/162, 164, 163.4

(56) References Cited

U.S. PATENT DOCUMENTS

| | | | |
|---|---|---|---|
| 3,793,022 A | 2/1974 | Land et al. ....................... 96/3 |
| 4,066,814 A | * 1/1978 | Chiklis |
| 4,070,097 A | 1/1978 | Gelber ........................ 350/165 |
| 4,234,654 A | * 11/1980 | Yatabe et al. |
| 4,320,169 A | * 3/1982 | Yatabe et al. ................ 428/333 |
| 4,386,130 A | * 5/1983 | Hayashi et al. |
| 4,422,721 A | 12/1983 | Hahn et al. .................. 350/164 |
| 4,465,736 A | * 8/1984 | Nishihara et al. |
| 4,747,674 A | 5/1988 | Butterfield et al. .......... 350/399 |
| 4,765,729 A | 8/1988 | Taniguchi .................... 351/163 |
| 4,940,602 A | 7/1990 | Taniguchi et al. ............. 427/40 |
| 4,904,525 A | 12/1990 | Taniguchi et al. ........... 428/328 |
| 5,106,671 A | 4/1992 | Amberger et al. ........... 428/215 |

(List continued on next page.)

FOREIGN PATENT DOCUMENTS

| | | |
|---|---|---|
| EP | 0300661 | 1/1989 |
| EP | 0749021 | 12/1996 |
| EP | 0924537 A1 | 6/1999 |
| WO | WO 96/31343 | 10/1996 |
| WO | WO 98/07056 | 2/1998 |
| WO | WO 99/42860 | 8/1999 |

OTHER PUBLICATIONS

Derwent Abstract of Japanese Application Publication (Kokai) No. 63–248,807.

Southwall Technologies, "Thin Film Coatings . . . ", SID International Symposium and Exhibition, San Diego, CA, May 1996.

SID 96 Applications Digest, Society for Information Display International Symposium Digest of Applications Papers, "Linear Polarizer Advancements with the Use of Hydrophobic Multilayer Thin–Film Coating Technology", M. D. Parish et al., 1996, pp. 25–28.

PCT Search Report WO 00/31570, PCT/US99/26229, dated Feb., 28, 2000.

*Primary Examiner*—Merrick Dixon
(74) *Attorney, Agent, or Firm*—Kirkpatrick & Lockhart LLP

(57) ABSTRACT

An antireflection film comprises a transparent substrate carrying on one surface a polymeric antireflection layer, this antireflection layer having a refractive index at least about 0.02 lower than that of the substrate and being formed from a cured polymer comprising repeating units derived from a fluoroalkene, an alkyl acrylate or methacrylate and a polyfunctional acrylate monomer. No inorganic antireflection layer is present between the substrate and the polymeric antireflection layer.

29 Claims, 3 Drawing Sheets

U.S. PATENT DOCUMENTS

| | | |
|---|---|---|
| 5,139,879 A | 8/1992 | Aharoni et al. .............. 428/422 |
| 5,171,414 A | 12/1992 | Amberger et al. ...... 204/192.26 |
| 5,178,955 A | 1/1993 | Aharoni et al. .............. 428/421 |
| 5,198,267 A | 3/1993 | Aharoni et al. .............. 427/162 |
| 5,225,244 A * | 7/1993 | Aharoni et al. |
| 5,234,748 A | 8/1993 | Demirymont et al. ...... 428/216 |
| 5,392,156 A * | 2/1995 | Kumagai et al. |
| 5,409,777 A | 4/1995 | Kennedy et al. ......... 428/411.1 |
| 5,449,550 A * | 9/1995 | Hasegawa et al. |
| 5,449,558 A | 9/1995 | Hasegawa et al. .......... 428/422 |
| 5,514,526 A * | 5/1996 | Nishi et al. |
| 5,693,366 A * | 12/1997 | Mase et al. |
| 5,763,061 A | 6/1998 | Ochiai et al. ................ 428/215 |
| 5,783,049 A | 7/1998 | Bright et al. .......... 204/192.14 |
| 5,820,957 A | 10/1998 | Schroeder et al. ......... 428/40.1 |

* cited by examiner

ANTIREFLECTION FILM

REFERENCE TO RELATED APPLICATION

This application is a continuation-in-part of application Ser. No. 09/026,271, filed Feb. 19, 1998, pending.

BACKGROUND OF THE INVENTION

This invention relates to an antireflection film comprising a polymeric substrate bearing a polymeric antireflection layer, and to a process for producing such an antireflection film.

It has long been known that it is advantageous to provide various articles, for example lenses, cathode ray tubes, flat panel displays, window films and windshields, with antireflection films which reduce the amount of light reflected from the surface of the article and thus reduce or eliminate "ghost" images formed by such reflected light For example, U.S. Pat. Nos. 5,106,671; 5,171,414 and 5,234,748 describe antireflection films which are placed on the inside surface of automobile windshields to reduce the intensity of the image of the instrument panel caused by light reflected from the inside surface of the windshield.

Antireflection coatings on a substrate typically comprise a plurality of inorganic layers, for example a metal or metal oxide layer and a silica layer. (The term "silica" is used herein in accordance with its normal meaning in the antireflection art to mean a material of the formula $SiO_x$ where x is not necessarily equal to two. As those skilled in the art are aware, such silica layers are often deposited by chemical vacuum deposition or sputtering of silicon in an oxygen atmosphere, so that the material deposited does not precisely conform to the stoichiometric formula $SiO_2$ of pure silica.) Typically, one surface of a silica layer is exposed, and this exposed surface, which has a high surface energy, as shown by its low contact angle with water, is highly susceptible to fingerprints and other marks. Such marks are extremely difficult to clean, often requiring the use of chemical cleaners.

Perhaps the most effective antireflection film available commercially is that sold by Southwall Technologies, 1029 Corporation Way, Palo Alto, Calif. 94303. This material comprises a 180 μm poly(ethylene terephthalate) substrate provided with an abrasion-resistant hard coat, and then successively with a 17 nm indium tin oxide (ITO) layer, a 23 nm silica layer, a 95 nm ITO layer, an 84 nm silica layer and finally a thin "lubrication" layer, which is formed from a fluoropolymer and is stated to improve the scratch resistance and the susceptibility of the surface to marking.

This complex film possesses excellent antireflection characteristics, but is so expensive (approximately US$10 per square foot, US$100 m$^{-2}$) as to preclude its use in many applications where antireflection films are desirable. Much of the high cost of this film can be attributed to the 95 nm ITO layer and 84 nm silica layer; since these layers are typically formed by sputtering, and the cost of a sputtered layer is directly proportional to its thickness. Furthermore, if it is desired to produce large quantities of such a complex film on a production line basis, the need for four separate sputtering stations, all of which must be maintained under high vacuum, results in a complex and costly apparatus.

For example, the aforementioned multilayer antireflection coatings are too expensive for use on photographic images. It has long been known that the appearance of photographs and other images can be improved by providing an antireflection coating over the image. For example, U.S. Pat. Nos. 3,793,022 and 3,925,081 describe peel-apart diffusion transfer photographic units in which the surface of the image-receiving element through which the final photograph is viewed (hereinafter called the "viewing surface") is provided with an antireflection layer comprising a fluorinated polymer. Preferably the fluorinated polymer also includes an isocyanate to improve the abrasion resistance of the antireflection layer. Similarly, U.S. Pat. No. 4,047,804 describes peel-apart diffusion transfer photographic units in which the viewing surface is provided with an antireflection layer comprising a fluorinated polymer incorporating a polydimethylsiloxane. U.S. Pat. Nos. 4,904,525 and 4,940,602 describe an optical article comprising a transparent plastic substrate; a hard coat film formed on a surface of the substrate, the film having an index of refraction of not less than 1.52; and a fluorine-containing organopolysiloxane-based film with a thickness of 10 nm to 500 nm, which has an index of refraction lower than that of the hard coat film by not less than 0.02, and which is formed on the hard coat film.

U.S. Pat. Nos. 5,061,769; 5,178,955; and 5,225,244 describe solid bodies having a reflective surface and provided with an antireflection coating of a terpolymer composition derived from (a) perfluoroalkylalkyl acrylate or methacrylate, (b) acrylic, methacrylic or itaconic acid, and (c) hydroxyl-containing acrylate or methacrylate. Among the solid bodies mentioned in these patents are optical lenses; eyeglasses, both plastic and glass; windows, glass as well as polymeric windows, such as windows of clear polymeric vinyl (including copolymers thereof), styrene, acrylics or polycarbonate; clear polymer films such as vinyl (including copolymers), nylon, polyester, and the like; the exterior viewing surface of liquid crystal displays, cathode ray tubes (e.g. video display tubes for televisions and computers); and the like; and the surface of glossy displays and pictures, such as glossy prints and photographs.

The selection of materials for use in antireflection coatings on plastic films and similar substrates is affected by numerous factors. The antireflection coating needs to have a lower refractive index than the plastic substrate in order to reduce surface reflections substantially. However, the antireflection coating must also adhere firmly to the substrate, be sufficiently transparent that it, does not affect the appearance of the underlying image, and have good scratch resistance and impact resistance. In addition, it is highly desirable that the antireflection coating have good anti-static properties, be flexible so that it does not affect the mechanical properties of the substrate and be resistant to water and common solvents to which it may be exposed. Some of these desirable characteristics of antireflection coatings tend to conflict with one another; for example, highly fluorinated coatings have low refractive indices, but tend to be too soft and lack sufficient adherence to other polymers for optimum performance as antireflection coatings.

The aforementioned parent application Ser. No. 09/026, 271 describes multilayer antireflection coatings comprising one or more inorganic antireflection layers and a top layer of a polymer having a refractive index not greater than about 1.53 over the wavelength range of 400 to 700 nm and a thickness of from about 20 to about 200 nm. In a preferred embodiment of this multilayer antireflection coating, the polymer layer is formed from a terpolymer comprising repeating units derived from a fluoroalkene, an alkyl acrylate or methacrylate and a polyfunctional acrylate monomer. It has now been found that this terpolymer can be used alone, without an inorganic antireflection layer, to provide a low cost, but effective, antireflection coating on polymeric and other transparent substrates. The resultant antireflection coatings have desirable properties and are especially useful on polymeric films used in the image-receiving elements of diffusion transfer photographic units.

SUMMARY OF THE INVENTION

Accordingly, this invention provides an antireflection film comprising a substantially transparent substrate bearing a polymeric antireflection layer, which forms one outer surface of the antireflection film. The antireflection layer has a refractive index at least about 0.02 less than that of the substrate over the wavelength range of 400 to 700 nm. The antireflection layer is formed from a cured polymer comprising repeating units derived from a fluoroalkene, an alkyl acrylate or methacrylate and a polyfunctional acrylate monomer; there is no inorganic antireflection layer present between the substrate and the polymeric antireflection layer.

This invention also provides a process for providing a polymeric antireflection film on a substantially transparent substrate, this substrate being free from inorganic antireflection layers. This process comprises depositing a layer of a curable composition on the substrate, the curable composition comprising a polymer of a fluoroalkene, a polymer of an alkyl acrylate or methacrylate, and a polyfunctional acrylate monomer, and effecting free radical curing of the deposited curable composition to form a polymeric antireflection layer having a refractive index at least about 0.02 less than that of the substrate over the wavelength range of 400 to 700 nm.

This invention also provides an image-receiving element adapted to receive dye and thereby form an image, the image-receiving element comprising:

a substantially transparent polymeric substrate;
 an image-receiving layer disposed on the polymeric substrate and containing at least one mordant for a dye; and
 a polymeric antireflection layer disposed on the opposed surface of substrate from the image-receiving layer and having a refractive index at least about 0.02 less than that of the substrate over the wavelength range of 400 to 700 nm, the antireflection layer being formed from a cured polymer comprising repeating units derived from a fluoroalkene, an alkyl acrylate or methacrylate and a polyfunctional acrylate monomer.

This invention also provides a photographic product for forming a diffusion transfer image and comprising:

a photosensitive element comprising at least one photosensitive layer having associated therewith an image dye-providing material, the photosensitive element being such that upon its exposure to light and contact with an alkaline developing composition, an image dye is released from non-exposed regions of the photosensitive element; and
 an image-receiving element superposed on the photosensitive element so as to receive image dye released from the photosensitive element and thereby form an image, the image-receiving element bearing, on its surface remote from the photosensitive element, a polymeric antireflection layer having a refractive index at least about 0.02 less than that of the substrate over the wavelength range of 400 to 700 nm, the antireflection layer being formed from a cured polymer comprising repeating units derived from a fluoroalkene, an alkyl acrylate or methacrylate and a polyfunctional acrylate monomer.

Finally, this invention provides an image display device comprising means for receiving data representing an image, and a screen capable of generating light to produce a visual image corresponding to the data received by the data receiving means, the screen having an outer surface through which the visual image can be viewed. The outer surface of the screen is provided with a polymeric antireflection layer having a refractive index at least about 0.02 less than that of the screen over the wavelength range of 400 to 700 nm. This antireflection layer is formed from a cured polymer comprising repeating units derived from a fluoroalkene, an alkyl acrylate or methacrylate and a polyfunctional acrylate monomer.

DETAILED DESCRIPTION OF THE INVENTION

Figure 1:
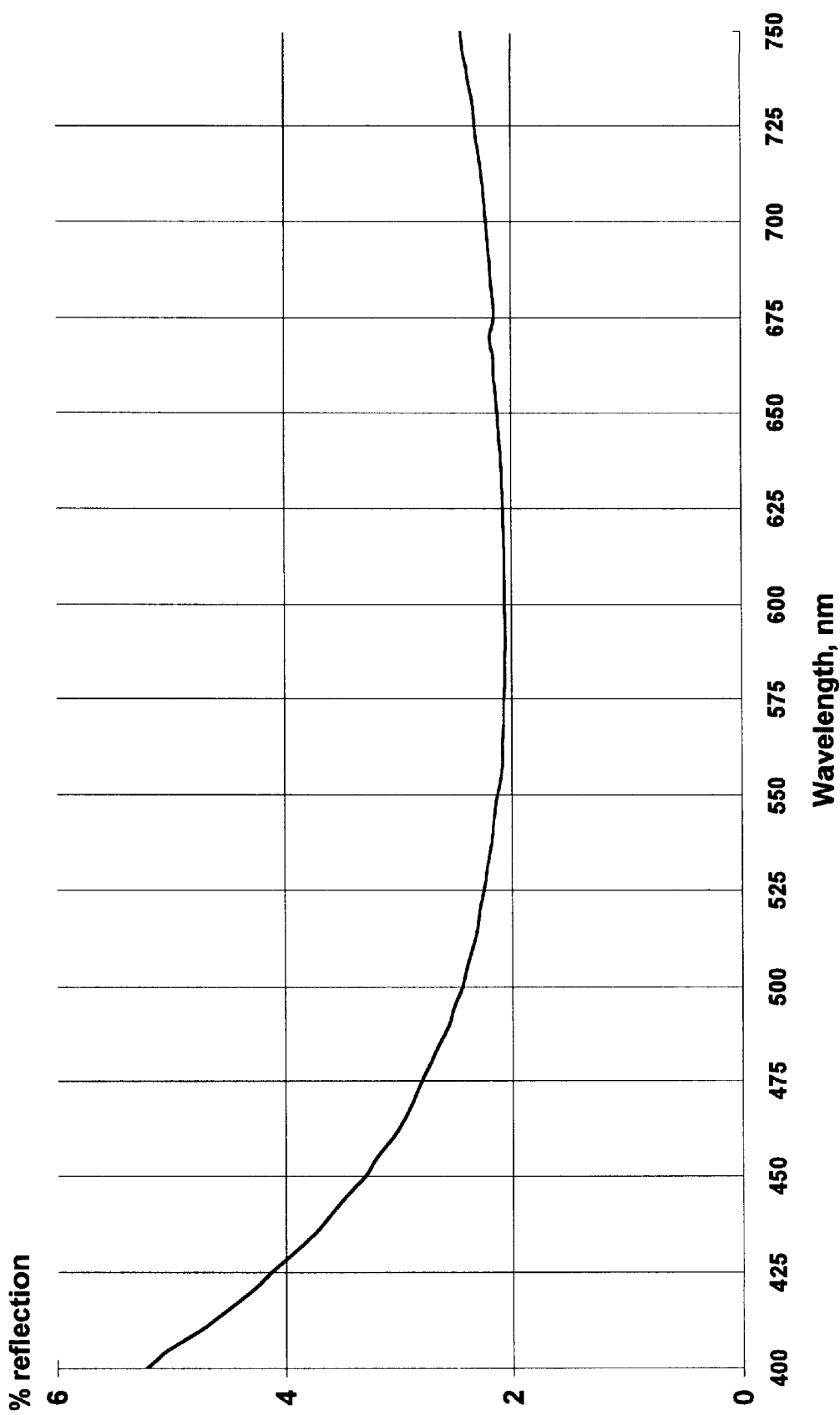
FIG. 1 of the accompanying drawing shows a reflectance curve for a first preferred antireflection film of the present invention comprising a preferred terpolymer on a "bare" poly(ethylene terephthalate) (PET) substrate, as prepared in Example 1 below.

As already indicated, the present invention provides an antireflection film comprising a substantially transparent substrate bearing a polymeric antireflection layer, there being no inorganic antireflection layers between the substrate and the polymeric antireflection layer. As described in more detail below, the substrate may be provided, on one or both surfaces, with a conventional hard coat before the antireflection layer is applied; thus, a hard coat may be present between the substrate and the antireflection layer. The antireflection layer has a refractive index at least about 0.02 less than that of the substrate over the visible wavelength range of 400 to 700 nm, and comprises repeating units derived from a fluoroalkene, an alkyl acrylate or methacrylate and a polyfunctional acrylate monomer ("polyfunctional" being used herein in its conventional sense to denote a material having a functionality of 3 or higher).

The substrate of the present film can be any material on which an antireflection coating is desired, provided of course that the substrate can withstand the (relatively mild) conditions needed for formation of the antireflection layer and provided that the substrate has a sufficiently high refractive index for the antireflection layer to fulfil properly its antireflection function. As will readily be apparent to those skilled in the art of antireflection coatings, in saying that the substrate is "substantially transparent" we do not exclude the possibility that the substrate may have some haze or color or similar deviation from ideal transparency, provided that the substrate permits a viewer to see material behind the substrate. Furthermore, although the substrate itself needs to be substantially transparent, the substrate may form only part of a larger article which includes non-transparent layers. Thus, the substrate might form part of a photograph, and be backed by a dye layer containing an image and a diffuse reflecting layer.

As is well known to those skilled in antireflection coatings, the antireflection properties of a coating on a substrate increase with difference in refractive index between the coating and the substrate. Thus, although in the antireflection film of the present invention, the antireflection coating must have a refractive index at least about 0.02 less than that of the substrate over the visible wavelength range of 400 to 700 nm, in general, it is desirable that this difference in refractive index be at least about 0.05 (and preferably more) over this wavelength range. Since the refractive indices of the polymers used to form the antireflection layers in the present invention typically have refractive indices of about 1.50 to about 1.53, to provide a relatively large difference between the refractive indexes of the antireflection layer and the substrate, it is desirable that the substrate have a refractive index of at least about 1.60 over the wavelength range of 400 to 700 nm.

Although other substrates may the used, the substrate will typically be either an organic polymer or a glass. One specific preferred type of organic polymeric substrate is polyester; suitable polyester films are readily available commercially, for example the 4 to 7 mil (101 to 177 $\mu$m) poly(ethylene terephthalate) films sold under the registered trademark "MELINEX" by ICI Americas Inc., Wilmington, Del. Such polyesters typically have refractive indices of about 1.65. Another preferred polymeric substrate is a polyphenylene polymer, for example those sold under the trademark "PARMAX" by Maxdem Incorporated, 140 East Arrow Highway, San Dimas, Calif. 91773-3336. These polyphenylene polymers have high refractive indices of about 1.69, and thus an highly effective antireflection layer can readily be formed thereon. These polyphenylene polymers also have the advantage of being both flexible and scratch-resistant, so that the anti-reflection layer can also provide scratch resistance to the substrate.

As already indicated, the polymeric substrate may be provided with coatings on one or both surfaces to improve its hardness and scratch resistance, to improve the adhesion of the antireflection layer to the substrate, or to provide any other desired properties, for example filtration of ultra-violet radiation or provision of a gas and/or moisture barrier. A hard coating on the substrate, which should have a higher refractive index than the substrate to improve the antireflection properties of the antireflection layer, will typically have a thickness of about 1 to about 15 $\mu$m, preferably from about 2 to about 3 $\mu$m, and such a hard coating may be provided by free radical polymerization (initiated either thermally or by ultra-violet radiation) of an appropriate polymerizable material. An especially preferred hard coat for use in the present invention is the acrylic polymer coating sold under the trademark "TERRAPIN" by Tekra Corporation, 6700 West Lincoln Avenue, New Berlin, Wis. 53151.

Although (at least in theory), the antireflection layer of the present film might be produced in other ways, it is preferred that this antireflection layer be formed on the polymeric substrate by depositing a layer of a curable composition and then curing this layer in situ. The relatively thin layer of curable composition required can be applied with good uniformity by solution coating or other conventional coating techniques. Obviously, the deposition of the layer of curable composition, and its subsequent curing, should be effected under conditions which do not cause damage to the polymeric substrate; these conditions of course vary with the exact polymeric substrate employed.

The curable composition may be cured by any conventional method, but is desirably cured by a free radical curing, which may be initiated either thermally or by ultra-violet radiation, although the latter is generally preferred. Persons skilled in polymer technology will be familiar with appropriate initiators, oxygen scavengers and other components useful in such free radical curing. However, it should be noted that, because of the extreme thinness of the polymeric antireflection layer desired in the present film, the type and proportion of initiator(s) required may differ from typical formulations intended for production of thicker polymer layers.

As already indicated, the antireflection layer in the film of the present invention typically has a refractive index not greater than about 1.53 over the wavelength range of 400 to 700 nm. The optimum thickness of the antireflection layer for any particular combination of materials in the substrate and the antireflection layer may be determined by routine empirical tests or by theoretical calculations, both of which will be familiar to those skilled in the art of designing antireflection films. In general, the antireflection layer desirably has a thickness of from about 20 to about 200 nm, preferably about 60 to about 130 nm. Polymeric antireflection layers having thicknesses within these ranges are readily prepared by depositing a solution of an appropriate curable composition in an organic solvent using conventional solution coating techniques, for example slot coating, removing the solvent and curing the resultant layer of curable material.

It is desirable to keep the refractive index of the polymer antireflection layer as low as possible consistent with other acceptable properties for this layer, especially hardness and scratch and stain resistance. The polymer should also be resistant to cleaning solvents which may be used on the film, for example ethyl alcohol, aqueous ammonia, acetone, gasoline and isopropanol, and food and cosmetic items, for example peanut butter and lipstick with which it may come into contact. Finally, the polymer should also have good durability, as measured, for example by its ability to withstand rubbing with steel wool. Desirably, the polymer layer has a refractive index below about 1.50 over the entire visible range of 400 to 700 nm. To provide a suitably low refractive index, the repeating units derived from a fluoroalkene in the polymeric antireflection layer are preferably derived from vinylidene fluoride and/or tetrafluoroethylene. This, the curable composition used to form the polymeric antireflection layer desirably comprises a polymer of a fluoroalkene, for example poly(vinylidene fluoride) or a vinylidene fluoride/tetrafluoroethylene copolymer, such as the material sold under the trademark "KYNAR" by San Diego Plastics, Inc., 2220 McKinley Avenue, National City, Calif. 91950. To provide the polymeric antireflection layer with good scratch resistance, it is desirable that the repeated units derived from an alkyl acrylate or methacrylate be derived from methyl methacrylate, and thus that the curable composition include a poly(methyl methacrylate), such as the material sold under the trademark "ELVACITE 2041" by ICI Acrylics, Inc., 3411 Silverside Road-McKean 2nd, Wilmington, Del. 19850-5391, or that sold under the trademark "ACRYLOID A21" by Rohm and Haas, 100 Independence Mall West, Philadelphia, Pa. 19106-2399. To promote cross-linking within the polymeric antireflection layer, and thus increase the hardness of this layer, a specific preferred polyfunctional acrylate monomer is that sold under the trademark "SR 399" by Sartomer, Inc., 502 Thomas Jones Way, Exton, Pa. 19341; this material is stated by the manufacturer to be dipentaerythritol pentaacrylate.

It is well known to those skilled in polymer science that most polymers have a negative dispersion with the visible range, i.e., their refractive index at 700 nm is smaller than their refactive index at 400 nm. Calculations show that such negative dispersion adversely affects the antireflection properties of the film and hence it is desirable to reduce such negative dispersion as far as possible. The aforementioned KYNAR polymer has a low refractive index and small negative dispersion, which render it very suitable for use in the present antireflection layer. While the desirability of a fluoroalkene polymer to provide low refractive index in the polymer layer and for an acrylate or methacrylate cross-linker to provide hardness in the same layer might suggest that the properties of the polymer layer must inevitably involve a compromise between the two properties, it has been found that, if the formulation of the curable composition is carefully chosen, segregation of material occurs spontaneously during curing, resulting in a polymer layer having an outer portion enriched in the acrylate or methacrylate polymer (and thus of enhanced hardness) and an inner portion enriched in the fluoroalkene polymer (and thus of reduced refractive index). An additional benefit of such segregation of acrylate or methacrylate polymer material during curing is that, under certain circumstances, it enables the cross-linking to occur in an oxygen-containing atmosphere, such as air, thereby avoiding the need for a nitrogen blanket as is customary during thin film ultra-violet curing, and thus reducing the cost of manufacture of the antireflection film.

The finished antireflection film of the present invention, having the antireflection coating formed thereon, may be applied to, for example, a cathode ray tube, a flat panel display, window glass or a windshield, which it is desired to provide with antireflection characteristics. However, as already indicated, the antireflection film is especially usefull in image-receiving elements, such as those used in self-developing photographic film units. Such image-receiving elements typically comprise a substantially transparent polymeric substrate, and an image-receiving layer disposed on one surface of the polymeric substrate and containing a mordant for one or more dyes which the image-receiving elements receives in order to form an image. This image is usually viewed through the polymeric substrate. Accordingly, by providing the surface of this substrate opposed to that on which the image-receiving layer is disposed with a polymeric antireflection layer of this invention, the antireflection properties of this surface can be improved, with consequent improvement in the apparent quality of the image. The antireflection film of the present invention is sufficiently inexpensive to be useful in such image-receiving elements, whereas the more elaborate antireflection films described above containing multiple dielectric layers are too expensive to be practicable in this use.

This invention extends to a photographic product for forming a diffusion transfer image and comprising an image-receiving element of the present invention as described in the preceding paragraph, in conjunction with a conventional photosensitive element for producing a diffusion transfer image, The antireflection films of the present invention are also useful in image display devices, for example cathode ray tubes, liquid crystal displays, gas plasma displays and others. The outer surface of such image display devices through which the image is viewed will typically be formed from either glass or a plastic. The antireflection film may be a separate plastic film provided with an antireflection layer and then applied to the glass or plastic outer surface of the display device. Alternatively, the antireflection layer may be formed directly on the glass or plastic front surface.

The antireflection film of the present invention may be especially useful when applied to so-called "flat screen" cathode ray tubes intended for use in computer monitors. It is well-known that, to enhance the contrast of such a cathode ray tube, it is necessary to provide a dark color to the display surface thereof. In traditional curved screen cathode ray tubes, the necessary dark color has been provided by tinting the glass; such an approach is practicable in curved screen tubes since the thickness of the glass is essentially constant throughout, so that the tint in the glass produces the same dark color over the whole display surface. However, so-called "flat screen" cathode ray tubes are now being introduced in which the entire front surface is essentially flat. In such flat screen tubes, the thickness of the glass varies over the display surface, being thicker near the edges than in the center of the screen. Accordingly, it is not possible to use tinted glass to provide the dark color needed in such flat screen tubes, since the variation in the thickness of the glass would result in the darkness of the screen varying over the display surface. The desired dark screen color may, however, be provided by applying to the glass an antireflection film of the present invention having at least one colored layer therein. This colored layer may, for example, be provided by incorporating into the anti-reflection film a tinted polymeric substrate. a tinted hard coat or a colored layer separate from the all the other layers of the film and serving solely to provide the necessary tint.

Preferred embodiments of the present invention will now be described, though by way of illustration only, to show preferred reagents, conditions and techniques used in the present process.

EXAMPLE 1

A liquid curable composition was prepared having the following composition (the proportions are by dry weight of the solution):

|  | % by weight |
|---|---|
| Poly(vinylidene fluoride) (KYNAR) | 46.8 |
| Methyl methacrylate (ACRYLOID A21) | 6.9 |
| Dipentaerythritol pentaacrylate (Sartomer SR 399) | 30.7 |
| Multifunctional acrylate monomer (Sartomer CD9051) | 3.0 |
| Coating additive (COATOSIL 3503[1]) | 4.0 |
| Adhesion promoter (SILANE A174[1]) | 1.0 |
| Curing initiator (DARACURE 1173[2]) | 2.0 |
| Curing initiator (QUANTACURE BMS[3]) | 4.0 |
| Oxygen scavenger (DIDMA[4]) | 1.6 |

Notes:
[1]Both available from OSi Specialties, 39 Old Ridgebury Road, Danbury, Connecticut 06810-5121.
[2]Available from Ciba-Geigy Corporation, 540 White Plains Road, P.O. Box 2005, Tarrytown, New York 10591-9005.
[3]Manufactured by Great Lakes Chemical Corporation, and available from Biddle Sawyer Corporation, 2 Penn Plaza, New York, New York 10121.
[4]Available from Aldrich Chemical Company, 1001 West St. Paul, Milwaukee, Wisconsin 53233.

The various components were prepared as stock solutions in methyl ethyl ketone (MEK), at 20 percent w/w, except that the ACRYLOID A21 and QUANTACURE BMS were prepared at 10 percent w/w, and the DARACURE and DIDMA were prepared at 5 percent w/w. The requisite quantities of the various stock solutions were then mixed, together with sufficient additional MEK to give 2000 g of a coating solution containing 2.75 percent solids w/w.

This coating solution was then applied via a slot coater to one surface of a "bare" 4 mil (101 $\mu$m) PET film, the solvent was allowed to evaporate and the film was placed under an ultra-violet lamp to cure the polymer to produce a polymeric antireflection layer approximately 94 nm thick. The reflectance of the resultant antireflection film was then measured on three samples over the wavelength range of 400–750 nm using a ultraviolet/visible spectrophotometer (Perkin-Elmer Model Lambda 40P, available from The Perkin-Elmer Corporation, 761 Main Avenue, Norwalk, Conn. 06859-0001). The results are shown in FIG. 1 of the accompanying drawings, which also shown the reflectance curve for the bare PET film used. The photopic reflectance value for the PET bearing the antireflection layer (measured according to CIE 1931, which specifies a weighted average of the reflectance over the spectral range of 450 to 650 nm centered at 550 nm and weighted mostly highly at this wavelength) was 1.86%, as opposed to 6.02% for the bare PET. The antireflection layer exhibited good resistance to scratching with steel wool or fingerprinting. The layer had a contact angle with water of approximately 89°.

EXAMPLE 2

Figure 2:
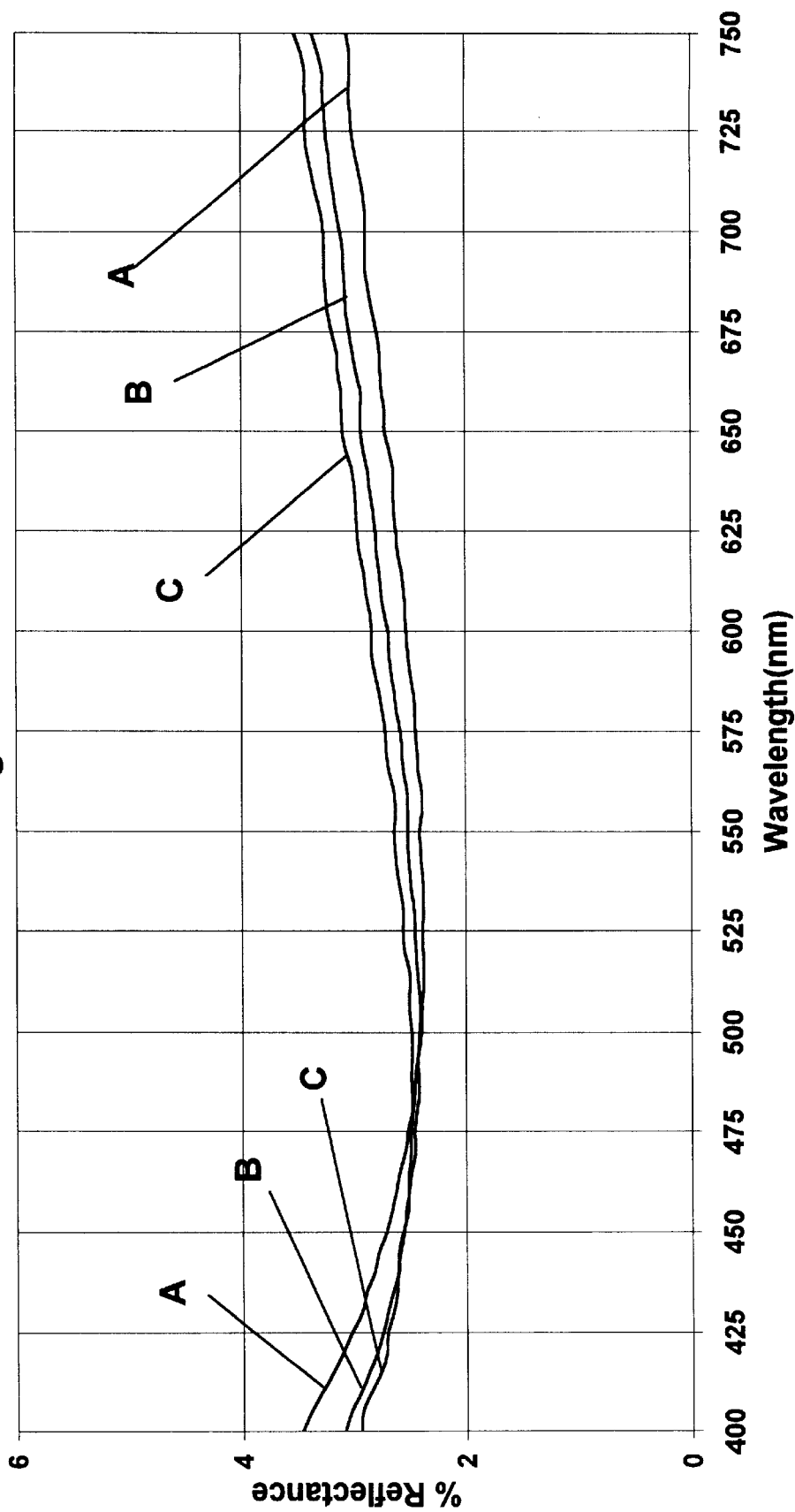
FIG. 2 shows a reflectance curve for a second preferred antireflection film of the present invention comprising the same terpolymer on a PET substrate bearing an acrylic hard coat, as prepared in Example 2 below.

Example 1 was repeated, except that, prior to the deposition of the polymeric antireflection layer, the surface of the PET which was to bear the antireflection layer was coated with a 4 μm acrylic hard coat of refractive index 1.522 using an ultraviolet-curable polyfunctional acrylate ester available commercially from Courtaulds Performance Films, P.O. Box 5068, Martinsville, Va. 24115. The reflectance of the final film was tested in the same way as in Example 1 above, and the results obtained from three samples of the film are shown in FIG. 2. The photoptic reflectances for the three samples of PET bearing the antireflection layer were 2.46, 2.57 and 2.69% respectively, as opposed to 4.47% for the hard-coated PET alone.

EXAMPLE 3

Figure 3:
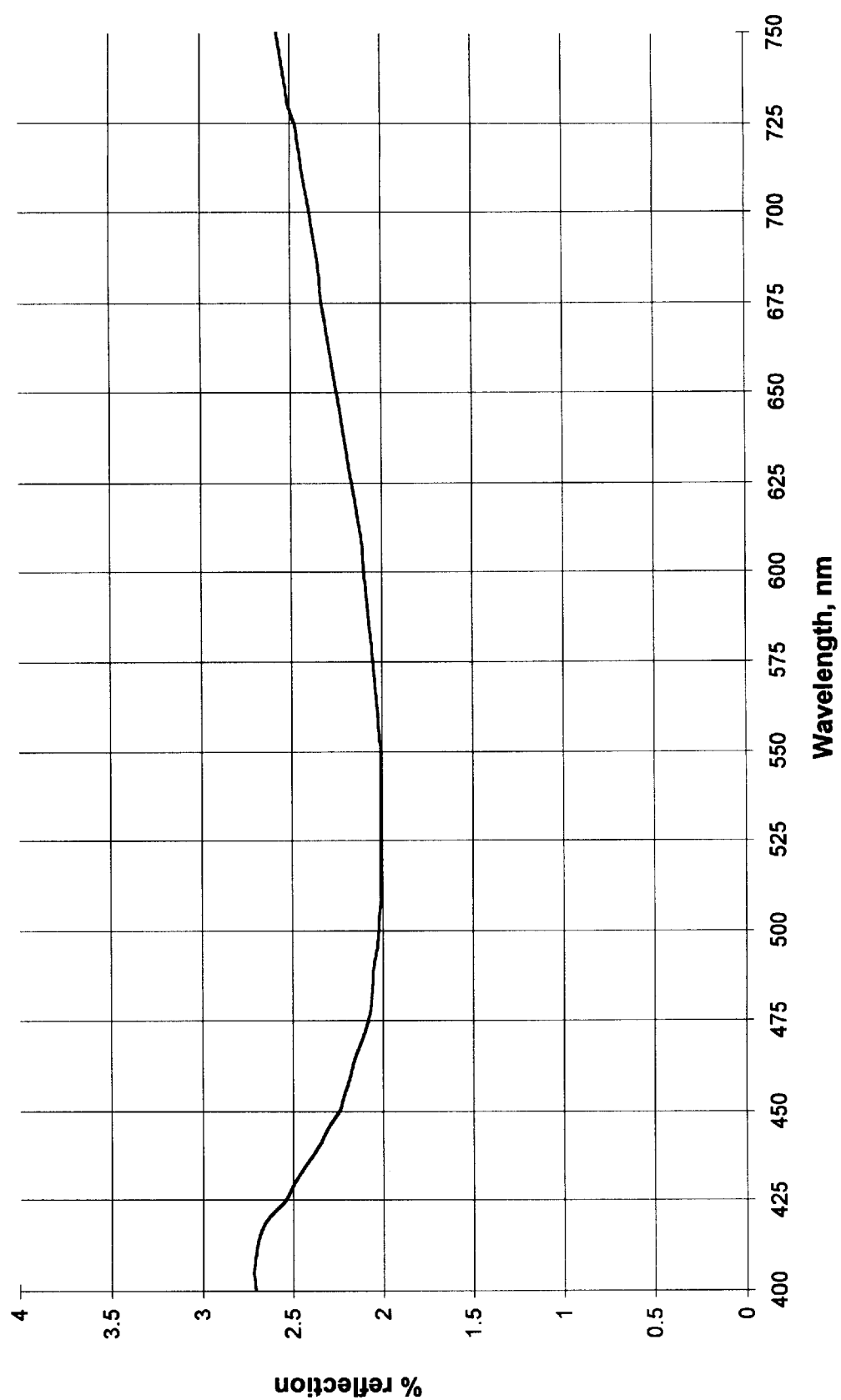
FIG. 3 shows a reflectance curve for a third preferred antireflection film of the present invention comprising the same terpolymer on a polyphenylene substrate, as prepared in Example 3 below.

Example 1 was repeated, except that the PET substrate was replaced by a substrate of polyphenylene (Parmax 1000, sold commercially by Maxdem) refractive index 1.69. The reflectance of the final film was tested in the same way as in Example 1 above, and the results are shown in FIG. 3.

It will be apparent to those skilled in the relevant art that numerous changes and modifications can be made in the preferred embodiment of the invention described above without departing from the scope of the invention.

What is claimed is:

1. An antireflection film comprising a substantially transparent substrate bearing a polymeric antireflection layer, the antireflection layer forming one outer surface of the antireflection film and having a refractive index at least approximately 0.02 less than that of the substrate over the wavelength range of 400 to 700 nm, the antireflection layer being formed from a cured polymer comprising repeating units derived from a fluoroalkene, an alkyl acrylate or methacrylate and a polyfuctional acrylate monomer, there being no inorganic antireflection layer present between the substrate and the polymeric antireflection layer.

2. An antireflection film according to claim 1 wherein the antireflection layer has a refractive index at least approximately 0.05 less than that of the substrate over the wavelength range of 400 to 700 nm.

3. An antireflection film according to claim 1 wherein the substrate has a refractive index of at least approximately 1.60 over the wavelength range of 400 to 700 nm.

4. An antireflection film according to claim 1 wherein the substrate comprises an organic polymer.

5. An antireflection film according to claim 4 wherein the organic polymer is a polyester or a polyphenylene polymer.

6. An antireflection film according to claim 5 wherein the polymer comprises poly(ethylene terephthalate).

7. An antireflection film according to claim 1 wherein the substrate comprises glass.

8. An antireflection film according to claim 1 having a hard coat disposed between the substrate and the polymeric antireflection layer, the hard coat having a refractive index higher than that of the substrate.

9. An antireflection film according to claim 1 wherein the polymeric antireflection layer comprises repeating units derived from vinylidene fluoride and/or tetrafluoroethylene.

10. An antireflection film according to claim 1 wherein the polymeric antireflection layer comprises repeating units derived from methyl methacrylate.

11. An antireflection film according to claim 1 wherein the polymeric antireflection layer comprises repeating units derived from dipentaerythritol pentaacrylate.

12. An antireflection film according to claim 1 wherein the polymeric antireflection layer has a thickness in the range of from about 20 to about 200 nm.

13. An antireflection film according to claim 12 wherein the polymeric antireflection layer has a thickness in the range of from about 60 to about 130 nm.

14. An antireflection film according to claim 1 wherein the polymeric antireflection layer has an outer portion enriched in the alkyl acrylate or methacrylate and an inner portion enriched in the fluoroalkene.

15. A process for providing a polymeric antireflection film on a substantially transparent substrate, the substrate being free from inorganic antireflection layers, the process comprising:

depositing a layer of a curable composition on the substrate, the curable composition comprising a polymer of a fluoroalkene, a polymer of an alkyl acrylate or methacrylate, and a polyfunctional acrylate monomer; and effecting free radical curing of the deposited curable composition to form a polymeric antireflection layer having a refractive index at least approximately 0.02 less than that of the substrate over the wavelength range of 400 to 700 nm.

16. A process according to claim 15 further comprising depositing a hard coat on the substrate before the polymeric antireflection layer is deposited thereon, the hard coat having a refractive index higher than that of the substrate, the curable composition being deposited on top of the hard coat.

17. A process according to claim 15 wherein the curing of the curable composition is conducted in air.

18. A process according to claim 15 wherein the substrate has a refractive index of at least approximately 1.60 over the wavelength range of 400 to 700 nm.

19. A process according to claim 15 wherein the substrate comprises an organic polymer.

20. A process according to claim 19 wherein the organic polymer is a polyester or a polyphenylene polymer.

21. A process according to claim 20 wherein the polymer comprises poly(ethylene terephthalate).

22. A process according to claim 15 wherein the substrate comprises glass.

23. A process according to claim 15 wherein the curable composition comprises a polymer of vinylidene fluoride and/or tetrafluoroethylene.

24. A process according to claim 15 wherein the curable composition comprises dipentaerythritol pentaacrylate.

25. A process according to claim 15 wherein the polymeric antireflection layer formed has a thickness in the range of from about 20 to about 200 nm.

26. A process according to claim 25 wherein the polymeric antireflection layer formed has a thickness in the range of from about 60 to about 130 nm.

27. An image-receiving element adapted to receive dye and thereby form an image, the image-receiving element comprising:

a substantially transparent polymeric substrate;

an image-receiving layer disposed on the polymeric substrate and containing at least one mordant for a dye; and a polymeric antireflection layer disposed on the opposed surface of substrate from the image-receiving layer and having a refractive index at least approximately 0.02 less than of the polymeric substrate over the wavelength range of 400 to 700 nm, the antireflection layer being formed from a cured polymer comprising repeating units derived from a fluoroalkene, an alkyl acrylate or methacrylate and a polyfunctional acrylate monomer.

28. A photographic product for forming a diffusion transfer image and comprising:

a photosensitive element comprising at least one photosensitive layer having associated therewith an image dye-providing material, the photosensitive element being such that upon its exposure to light and contact with an alkaline developing composition, an image dye is released from non-exposed regions of the photosensitive element; and an image-receiving element in superposed relationship with the photosensitive element so as to receive image dye released from the photosensitive element and thereby form an image, the image-receiving element bearing, on its surface remote from the photosensitive element, a polymeric antireflection layer having a refractive index at least approximately 0.02 less than that of the image-receiving element over the wavelength range of 400 to 700 nm, the antireflection layer being formed from a cured polymer comprising repeating units derived from a fluoroalkene, an alkyl acrylate or methacrylate and a polyfunctional acrylate monomer.

29. An image display device comprising:

means for receiving data representing an image; and a screen capable of generating light to produce a visual image corresponding to the data received by the data receiving means, the screen having an outer surface through which the visual image can be viewed, the outer surface of the screen being provided with a polymeric antireflection layer having a refractive index at least approximately 0.02 less than that of the screen over the wavelength range of 400 to 700 nm, the antireflection layer being formed from a cured polymer comprising repeating units derived from a fluoroalkene, an alkyl acrylate or methacrylate and a polyfunctional acrylate monomer.

* * * * *

UNITED STATES PATENT AND TRADEMARK OFFICE
CERTIFICATE OF CORRECTION

PATENT NO. : 6,379,788 B2 Page 1 of 1
DATED : April 30, 2002
INVENTOR(S) : Choi, Hyung-Chul It is certified that error appears in the above-identified patent and that said Letters Patent is hereby corrected as shown below:

<u>Title page,</u>
Item [56], References Cited, U.S. PATENT DOCUMENTS, insert:
-- 3,925,081   12/9/75    Chiklis
4,047,804   9/13/77    Stephens
4,234,654   11/18/80   Yatabe et al.
5,061,769   10/29/91   Aharoni
5,118,579   6/2/92     Aharoni --

<u>Column 3,</u>
Line 25, delete "," and insert in place thereof -- ; --.
Line 45, delete "." preceding "image".

<u>Column 7,</u>
Line 28, delete "usefull" and insert in place thereof -- useful --.
Line 53, delete "," and insert in place thereof -- . --.

Signed and Sealed this

Twenty-ninth Day of July, 2003

JAMES E. ROGAN
*Director of the United States Patent and Trademark Office*